(12) United States Patent
Hollick (10) Patent No.: US 7,032,588 B2
(45) Date of Patent: Apr. 25, 2006

(54) METHOD AND APPARATUS FOR PREHEATING VENTILATION AIR FOR A BUILDING

(76) Inventor: John Hollick, 2 Snowberry Lane, King City, Ontario (CA) L7B 1J9

( * ) Notice: Subject to any disclaimer, the term of this patent is extended or adjusted under 35 U.S.C. 154(b) by 37 days.

(21) Appl. No.: 10/846,112

(22) Filed: May 14, 2004

(65) Prior Publication Data

US 2005/0252507 A1 Nov. 17, 2005

(51) Int. Cl.
*E04D 13/18* (2006.01)
(52) U.S. Cl. ............... 126/621; 126/628; 126/623; 126/655; 126/674; 126/675
(58) Field of Classification Search ............... 126/621, 126/628, 623, 655, 674, 675, 622, 629, 634, 126/652
See application file for complete search history.

(56) References Cited

U.S. PATENT DOCUMENTS

| | | | |
|---|---|---|---|
| 4,478,210 A | * | 10/1984 | Sieradski ............... 126/570 |
| 4,774,932 A | | 10/1988 | Hollick |
| 4,899,728 A | | 2/1990 | Peter et al. |
| 4,934,338 A | | 6/1990 | Hollick et al. |
| 5,596,981 A | * | 1/1997 | Soucy ............... 126/704 |
| 5,935,343 A | | 8/1999 | Hollick |

FOREIGN PATENT DOCUMENTS

| | | |
|---|---|---|
| CA | 1196825 | 11/1985 |
| CA | 1283333 | 4/1991 |
| CA | 1326619 | 2/1994 |
| CA | 2230471 | 9/2001 |

\* cited by examiner

*Primary Examiner*—Alfred Basichas
(74) *Attorney, Agent, or Firm*—Tarolli, Sundheim, Covell & Tummino L.L.P.

(57) ABSTRACT

An apparatus for pre-heating ventilation air for a building. The apparatus includes a first sunlight-absorbent collector panel on the building. The panel is exposed to ambient air and defines a first air collection space between itself and the building. The first sunlight-absorbent collector panel has a plurality of air inlet openings to allow the ambient air to pass through the openings to the first air collection space. A second sunlight-absorbent collector panel on the building is adjacent the first sunlight-absorbent collector panel and defines a second air collection space between itself and the building. The second sunlight-absorbent collector panel has a plurality of air inlet openings to allow air to pass through the openings to the second air collection space. A glazing covers the second sunlight-absorbent collector panel and defines an intermediary air flow chamber between itself and the second sunlight-absorbent collector panel. The intermediary air flow chamber is in communication with the first air collection space to receive air therefrom. The air inlet openings in the second sunlight-absorbent collector panel provide communication between the intermediary air flow chamber and the second air collection space. An air outlet extends from the second air collection space into the building for air flow therethrough. A fan communicates with the air outlet for moving air from the second air collection space into the building, through the air outlet.

42 Claims, 7 Drawing Sheets

METHOD AND APPARATUS FOR PREHEATING VENTILATION AIR FOR A BUILDING

FIELD OF THE INVENTION

The present invention relates in general to the provision of ventilation air for buildings and more particularly, to heating the ventilation air prior to introduction into the building, using solar energy

BACKGROUND OF THE INVENTION

Commercial, industrial, domestic and apartment buildings require ventilation, and it is common for the natural leakage around doors, wall-ceiling joints, etc. found in standard building construction to allow sufficient air to enter the building. A pressure drop from the exterior to the interior of the building can arise from many factors, such as high winds, exhaust fans and combustion air for fuel-burning furnaces. This tends to draw outside air into the building through any crack or opening.

The problem with the conventional approach is that the amount of ventilation air is not controlled, the temperature in the building near the outside walls is lower than average and less comfortable, and additional heat must be provided to heat the outside air to room temperature during the heating season.

This problem has typically been solved by installing gas, oil or electric heaters and air-moving fans to heat the air within the buildings. When solar panels are used to heat a building, air is recirculated from the building through the collector and back. During the heating season, the ambient temperature is lower than the room temperature, and therefore a recirculating solar collector operates at a much reduced efficiency level.

Canadian Patent No. 1,196,825, issued Oct. 4, 1985 teaches the use of fresh make-up air for ventilation purposes, rather than simply recirculating interior air from a building. Using this method, the fresh make-up air is pre-heated by passing the air through a solar collector prior to introduction into the building. A glazing is provided over the solar collector, to provide a space between the two, through which the air is passed for heating. While this particular arrangement reduces the need for the use of consumable energy, the use of the glazing increases costs significantly. Advantageously, the glazing reduces radiation heat loss and negative wind effects. However, the amount of sunlight that is transmitted through the glazing is reduced to only about 85% of the sunlight. The use of a conventional glazed panel suffers other disadvantages including the requirement that the glazed panels be sealed. This again adds to the cost of the panels. Alternatively, if the glazed panels are used for heating fresh air, dirt and dust builds up in the panels and particularly on the underside of the glazing and there is no simple cleaning method. Therefore the panels must be designed for cleaning at regular intervals.

Canadian Patent No. 1,326,619, issued Feb. 1, 1994 and U.S. Pat. Nos. 4,899,728 and 4,934,338, issued Feb. 13, 1990 and Jun. 19, 1990, respectively, disclose the use of a solar panel that does not include a glazing, to heat fresh make-up air prior to introduction into a building. These systems are very efficient when heating large volumes of air per surface area of solar panel (i.e. ~6 cubic feet per minute). This efficiency drops dramatically when lower air flow rates are used, however. Using low flow rates results in higher temperatures on the solar panel, leading to increased radiation heat loss to ambient. These systems also suffer other disadvantages. For example, the maximum temperature rise that is realized is approximately 30° C. over ambient temperature, for low flow designs. Clearly, this temperature rise is not sufficient in cold climate use. Also, the efficiency is greatly reduced on windy days as the wind blows heat away around the air inlets if the velocity of the air entering the panels is not great enough. Thus, these panels are best used on, for example, a south-facing wall, and are not as effective when used on a roof, due to increased wind velocities on a roof top. This is undesirable as the roof is a preferred position for solar panels for many people.

It is desirable to provide an apparatus for pre-heating ventilation air for a building that obviates or mitigates at least some of the disadvantages of the prior art.

SUMMARY OF THE INVENTION

In one aspect of an embodiment of the present invention, there is provided an apparatus for pre-heating ventilation air for a building. The apparatus includes a first sunlight-absorbent collector panel on the building. The panel is exposed to ambient air and defines a first air collection space between itself and the building. The first sunlight-absorbent collector panel has a plurality of air inlet openings to allow the ambient air to pass through the openings to the first air collection space. A second sunlight-absorbent collector panel on the building is adjacent the first sunlight-absorbent collector panel and defines a second air collection space between itself and the building. The second sunlight-absorbent collector panel has a plurality of air inlet openings to allow air to pass through the openings to the second air collection space. A glazing covers the second sunlight-absorbent collector panel and defines an intermediary air flow chamber between itself and the second sunlight-absorbent collector panel. The intermediary air flow chamber is in communication with the first air collection space to receive air therefrom. The air inlet openings in the second sunlight-absorbent collector panel provide communication between the intermediary air flow chamber and the second air collection space. An air outlet extends from the second air collection space into the building for air flow therethrough. A fan communicates with the air outlet for moving air from the second air collection space into the building, through the air outlet.

In another aspect of an embodiment of the present invention, there is provided a method of heating ventilation air for a building. The method includes: providing a first sunlight-absorbent collector panel on the building, the panel being exposed to ambient air and defining a first air collection space between itself and the building, the first sunlight-absorbent collector panel having a plurality of air inlet openings to allow ambient air to pass through the openings to the first air collection space; providing a second sunlight-absorbent collector panel on the building, the second sunlight-absorbent collector panel defining a second air collection space between itself and the building, the second sunlight-absorbent collector panel having a plurality of air inlet openings to allow air to pass through the openings to the second air collection space; providing a glazing covering the second sunlight-absorbent collector panel and defining an intermediary air flow chamber between itself and the second sunlight-absorbent collector panel, the intermediary air flow chamber being in communication with the first air collection space to receive air therefrom, the air inlet openings in the second sunlight-absorbent collector panel providing communication between the intermediary air flow chamber and the second air collection space; pre-heating outside air in the first air collection space, with solar heat from the first sunlight-absorbent collector panel and passing the pre-heated air into the intermediary flow chamber; heating the pre-heated air in the second air collection space by passing the pre-heated air from the intermediary flow chamber into the second air collection space, to thereby provide heated air; and withdrawing the heated air through an air outlet from the second air collection space and expelling the air into the building.

In still another aspect of an embodiment of the present invention, there is provided an apparatus for use with a fan for supplying pre-heated ventilation air for a building. The apparatus includes a first sunlight-absorbent collector panel on the building. The panel is exposed to ambient air and defines a first air collection space between itself and the building. The first sunlight-absorbent collector panel has a plurality of air inlet openings to allow the ambient air to pass through the openings to the first air collection space. A second sunlight-absorbent collector panel on the building is adjacent the first sunlight-absorbent collector panel and defines a second air collection space between itself and the building. The second sunlight-absorbent collector panel has a plurality of air inlet openings to allow air to pass through the openings to the second air collection space. A glazing covers the second sunlight-absorbent collector panel and defines an intermediary air flow chamber between itself and the second sunlight-absorbent collector panel. The intermediary air flow chamber is in communication with the first air collection space to receive air therefrom. The air inlet openings in the second sunlight-absorbent collector panel provide communication between the intermediary air flow chamber and the second air collection space. An air outlet from said second air collection space for air flow therethrough for supplying to the building after withdrawal of the pre-heated air by the fan.

Thus, the air is heated using a two-stage solar heater that provides benefits of both the unglazed and the glazed systems. Advantageously, air is heated to temperatures that are only available using solar collectors with glazing, while the costs are closer to those of the solar collectors without glazing. In one aspect, the unglazed solar collector includes very fine holes that filter much of the dust particles from the air. Thus, air is filtered by first passing the air through the unglazed solar collector, prior to passing the air through the glazed solar collector. Thus, less dirt and dust builds up on the underside of the glazed solar collector as compared to glazed solar collectors that receive unfiltered air.

Also, the two-stage solar heater design lends to the use of the roof area of a building, where the wind is stronger than along the walls. Also, the unglazed portion can be located on a wall while the glazed portion is located on the roof of a building. By utilizing the roof of the building, the available surface area for the solar collector is increased.

BRIEF DESCRIPTION OF THE DRAWINGS

The present invention will be better understood with reference to the following drawings and the description, in which.

DETAILED DESCRIPTION OF THE PREFERRED EMBODIMENTS

Figure 1:
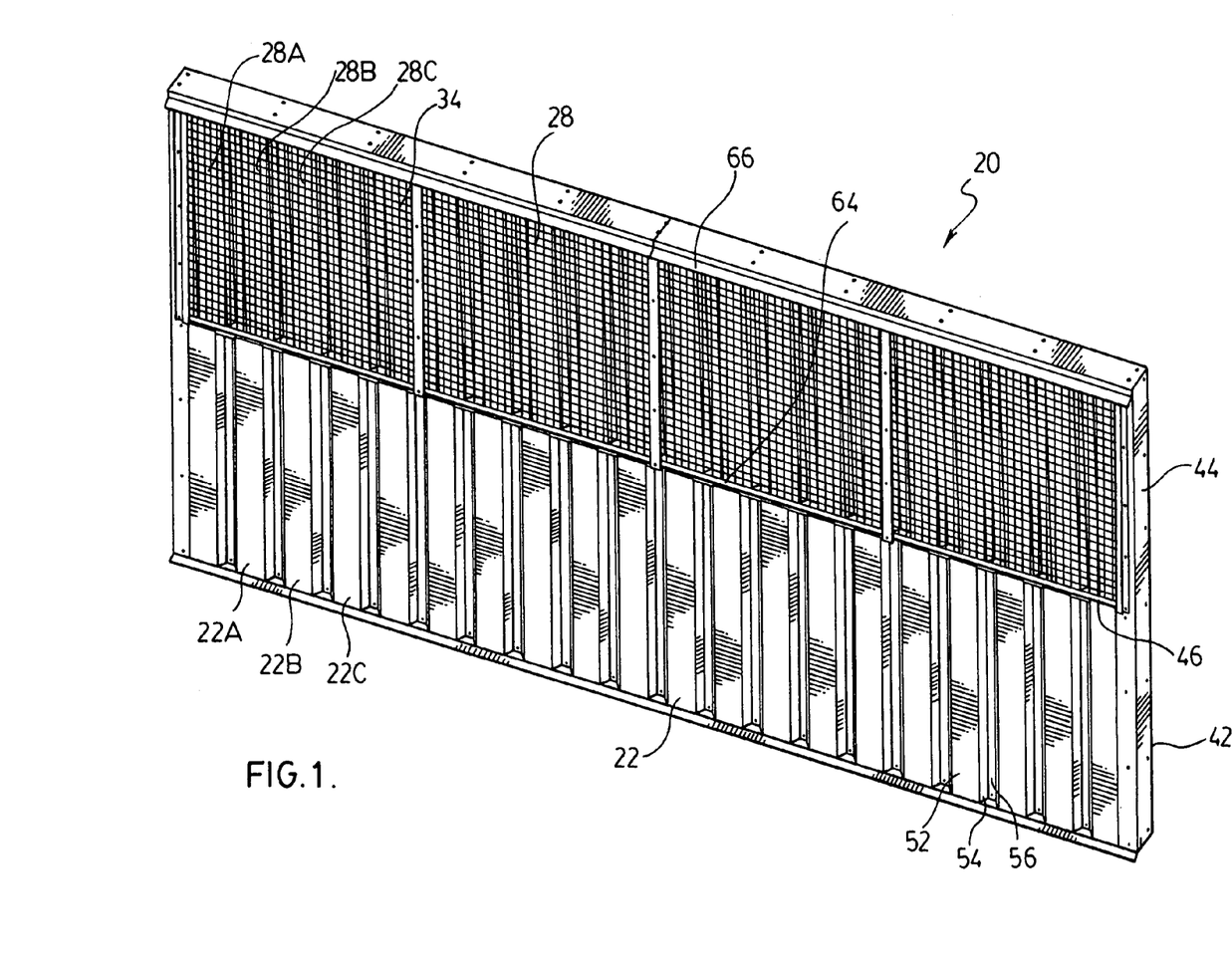
FIG. 1 is a perspective view of a solar heating apparatus according to an embodiment of the present invention.
Figure 1A:
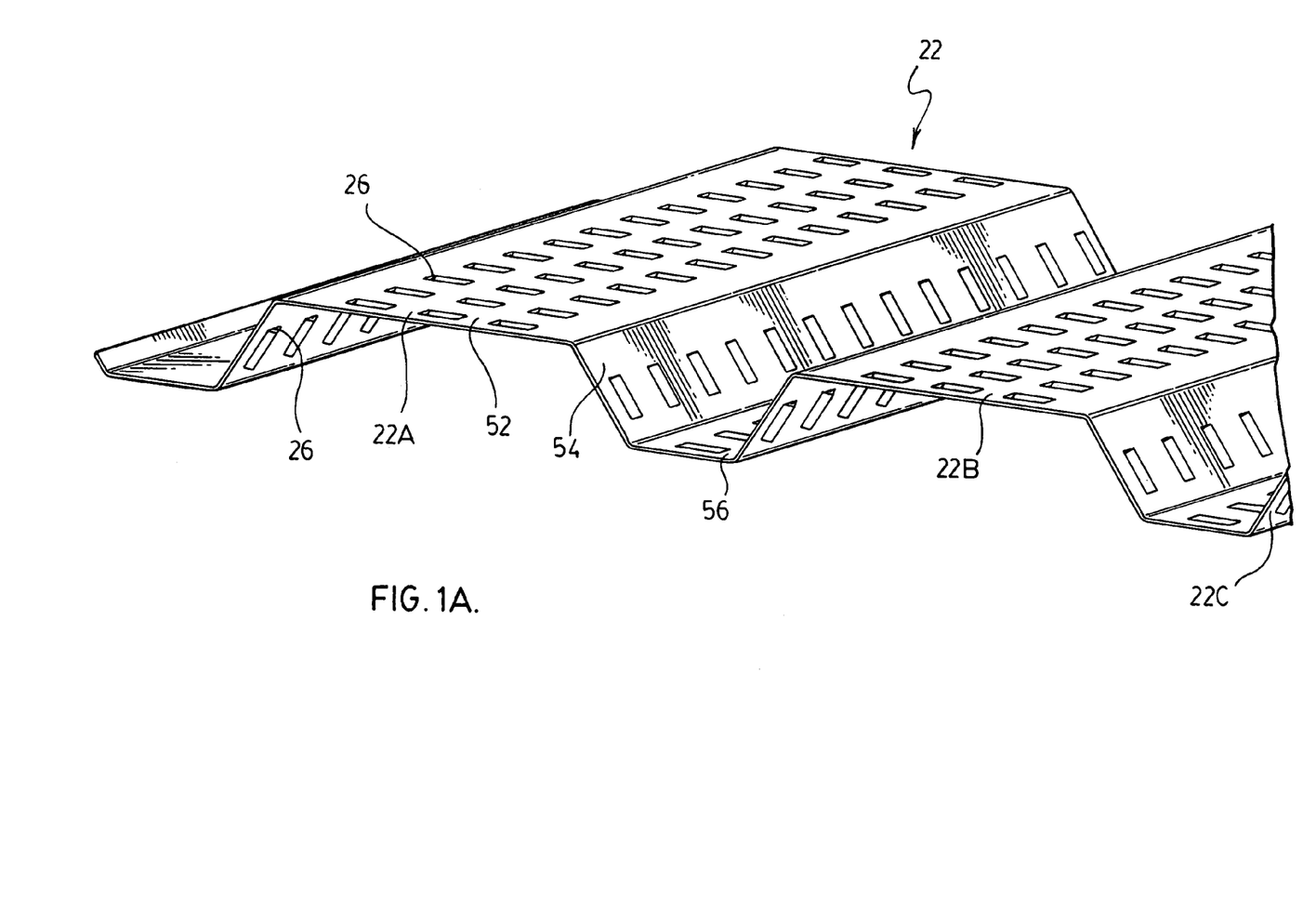
FIG. 1A is a perspective view of a portion of the solar heating apparatus of FIG. 1, drawn to a larger scale.
Figure 1B:
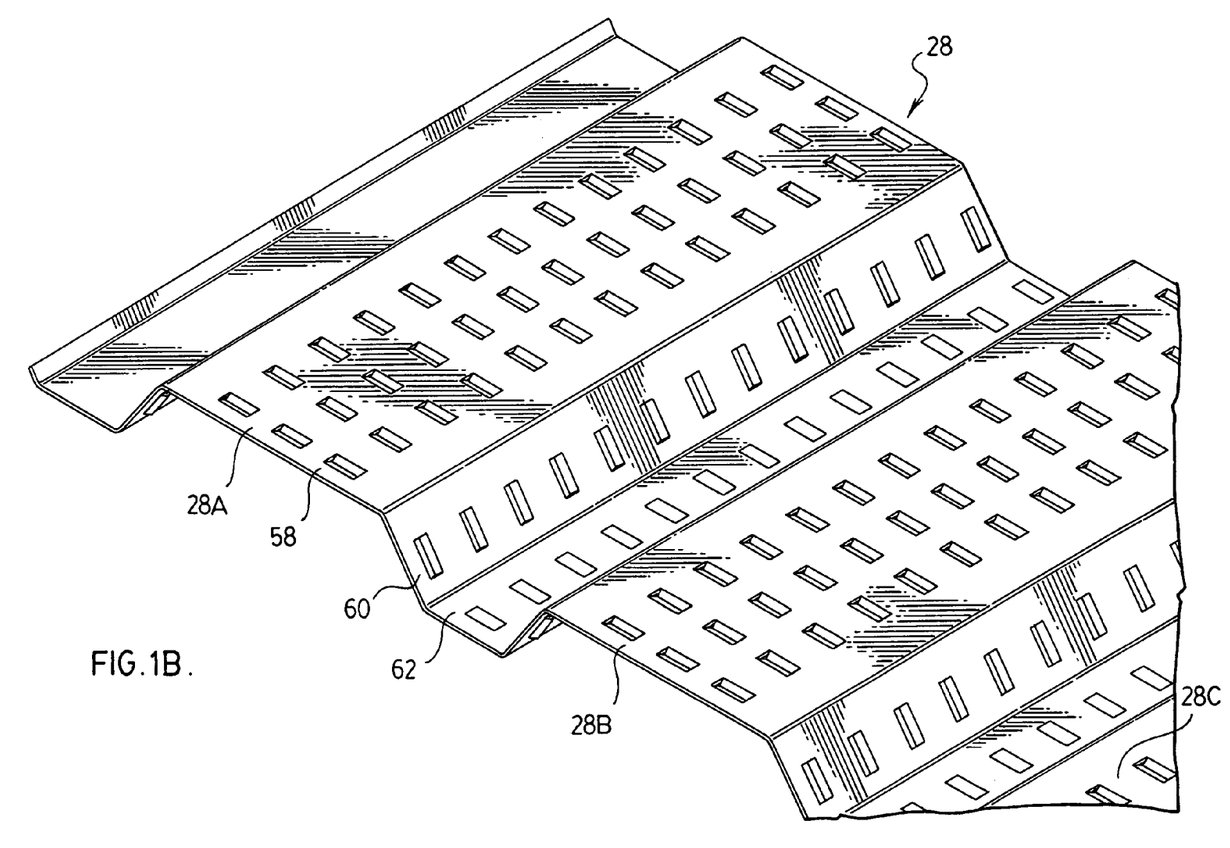
FIG. 1B is a perspective view of another portion of the solar heating apparatus of FIG. 1, drawn to a larger scale.
Figure 2:
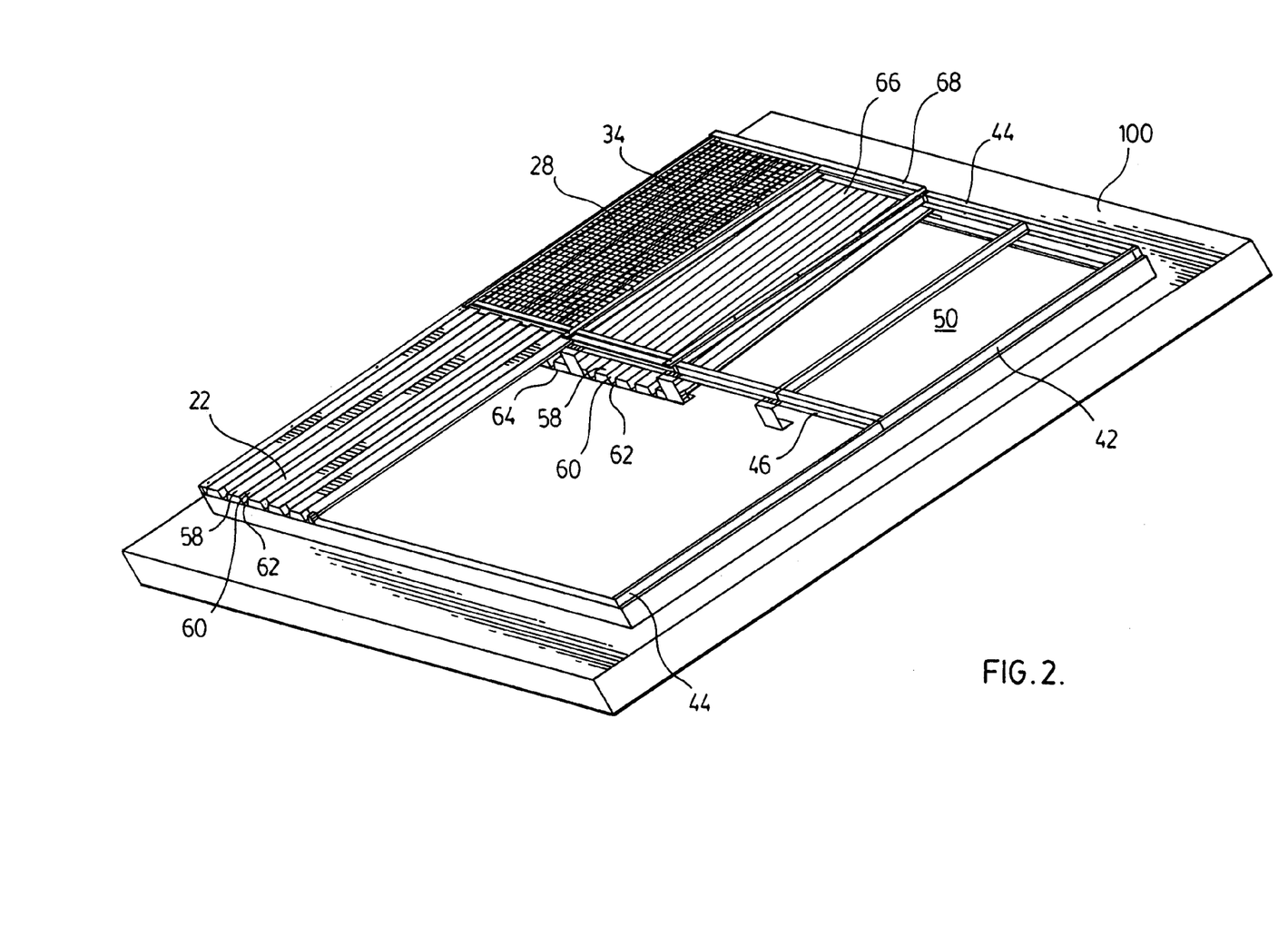
FIG. 2 is a perspective view of the solar heating apparatus of FIG. 1, shown mounted on a roof, with portions of the apparatus missing for illustration and description purposes.
Figure 3:
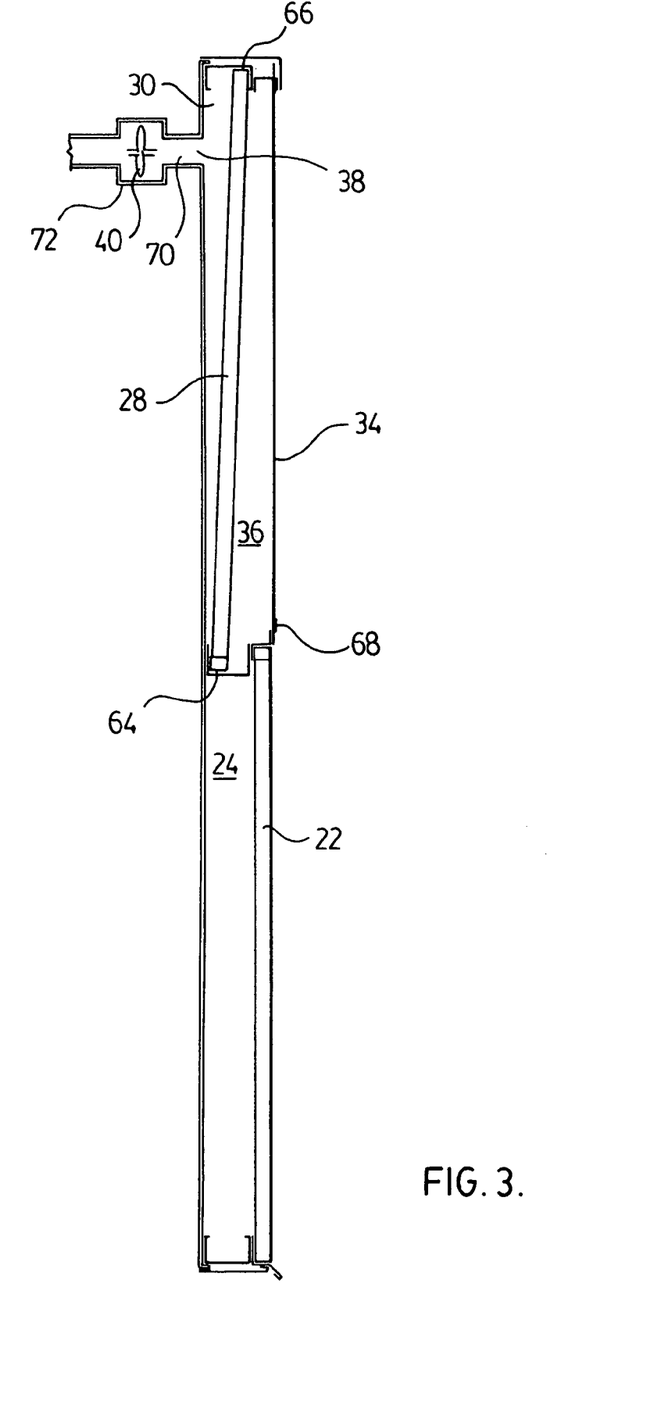
FIG. 3 is a sectional side view of the solar heating apparatus of FIG. 1.

Reference is first made to FIGS. 1 to 3 to describe a solar heating apparatus for pre-heating ventilation air for a building according an embodiment of the present invention, and indicated generally by the numeral 20. The apparatus 20 includes a first sunlight-absorbent collector panel 22 for locating on the building. The panel 22 is exposed to ambient air and defines a first air collection space 24 between itself and the building. The first sunlight-absorbent collector panel 22 has a plurality of air inlet openings 26 to allow the ambient air to pass through the openings 26 to the first air collection space 24. A second sunlight-absorbent collector panel 28 for locating on the building, adjacent the first sunlight-absorbent collector panel 22, defines a second air collection space 30 between itself and the building. The second sunlight-absorbent collector panel 28 has a plurality of air inlet openings 32 to allow air to pass through the openings 32 to the second air collection space 30. A glazing 34 covers the second sunlight-absorbent collector panel 28 and defines an intermediary air flow chamber 36 between itself and the second sunlight-absorbent collector panel 28. The intermediary air flow chamber 36 is in communication with the first air collection space 24 to receive air therefrom. The air inlet openings 32 in the second sunlight-absorbent collector panel 28 provide communication between the intermediary air flow chamber 36 and the second air collection space 30. An air outlet 38 extends from the second air collection space 30 into the building for air flow therethrough. A fan 40 communicates with the air outlet 38 for moving air from the second air collection space 30 into the building, through the air outlet 38.

One embodiment of the solar heating apparatus 20 will now be further described with reference to the Figures. Referring particularly to FIGS. 1 to 3, the apparatus 20 is fixed to an outer surface of the roof 100 of the building. As shown in FIGS. 1 and 2, the first and second sunlight-absorbent collector panels 22, 28, referred to herein as first and second collector panels 22, 28, are fixed to the outer surface of the roof 100. The roof 100 is angled such that the first collector panel 22 is located at a position on the roof 100 that is below the position of the second collector panel 28.

The first and second collector panels 22, 28 are fixed to the outer surface of the roof 100 of the building in a metal framing structure 42 that includes a perimeter metal frame 44 and an interior longitudinal support bar 46. In the present embodiment, the longitudinal support bar 46 separates the portion of the metal framing structure 42 containing the first collector panel 22 and the portion of the metal framing structure 42 containing the second collector panel 28. The metal framing structure 42 including the perimeter metal frame 44 and the longitudinal support bar 46 is fixed to the roof 100 of the building using suitable fasteners.

The metal framing structure 42 also includes a backing 50 of metal panels that are secured against the roof 100 of the building, within the perimeter metal frame 44. Thus, the backing 50 is seated against the surface of the roof 100.

The perimeter metal frame 44 is sealed to the roof 100 using, for example, silicon caulking. Similarly, the metal panels of the backing 50 are sealed together and to the perimeter metal frame 44.

The perimeter metal frame 44 includes a track for receiving edges of the first and second collector panels 22, 28 therein. The longitudinal support bar 46 also includes tracks for receiving edges of the first and second collector panels 22, 28 therein. It will be appreciated that the tracks are formed in the perimeter metal frame 44. Similarly, the tracks are formed in the longitudinal support bar 46.

The first collector panel is secured within the metal framing structure 42 in the tracks of the perimeter metal frame 44 and the track on one side of the longitudinal support bar 46. It will be noted that the first panel 22 includes a number of trapezoidal corrugations that define a plurality of similar and overlapping sub-panels 22a, 22b, 22c . . . etc. Each of the sub-panels or trapezoidal corrugations 22a, 22b, 22c . . . etc. includes a flat top portion 52, a pair of sloping side walls 54 and generally flat gutter walls 56. Each sloping side wall 54 extends from a respective side of the flat top portion 52 and each gutter wall 56 extends from a respective side wall 54.

The first collector panel 22 is appropriately secured within the metal framing structure 42 such that each top portion 52 of the corrugations is generally parallel with and spaced from the backing 50. Clearly each top portion 52 is also generally parallel with the surface of the roof 100 of the building. Thus, the first collection air space 24 is left between the first panel 22 and the surface of the roof 100.

As shown in FIG. 1A, the first panel 22 includes the air inlet openings 26 distributed throughout the generally flat top portion 52, the sloping side walls 54 and the gutter walls 56. The air inlet openings 26 provide openings for the first air collection space 24 for ambient air to travel from the exterior of the building into the first air collection space 24. In the present embodiment, the air inlet openings 26 are generally uniformly distributed over the corrugated first collector panel 22 and are formed by rotary punching slits in the first collector panel 22 such that the gaps at the end of the slits provide the air inlet openings 26. The air inlet openings 26 are small to aid in filtering air prior to entry into the solar heating apparatus 20.

The first collector panel is coated on an exterior side thereof, with a selective coating. The selective coating is a solar radiation absorbing coating for absorbing solar radiation with low infra-red heat radiation emission at temperatures occurring at the collector panel on a sunny day, to keep total energy losses low.

Like the first collector panel 22, the second collector panel 28 is also secured within the metal framing structure 42, in the tracks of the perimeter metal frame 44 and one side of the track of the longitudinal support bar 46. Again, the second collector panel 28 includes a number of trapezoidal corrugations that define a plurality of similar and overlapping sub-panels 28a, 28b, 28c . . . etc. Each of the trapezoidal corrugations (sub-panels) includes a generally flat top portion 58, a pair of sloping side walls 60 and a generally flat gutter wall 62. Each sloping side wall 60 extends from a respective side of the flat top portion 58 and each gutter wall 62 extends from a respective side wall 60.

Unlike the first collector panel 22, however, the second collector panel 28 is appropriately secured within the metal framing structure 42 such that each top portion 58 is not parallel with the backing 50 and the surface of the roof 100. Instead, each top portion 58 lies at an angle with the backing 50 and thus at an angle with the surface of the roof 100, such that the edge 64 of the second collector panel 28 that is closest to the first collector panel 22 is adjacent the backing 50 (with a side of the track disposed between the edge 64 of the second collector panel 28 and the surface of the roof 100), and the edge 66 of the second collector panel 28 that is distal the first collector panel 22 is spaced from the backing 50. Clearly the distance between the second collector panel 28 and the backing 50 increases with distance from the first collector panel 22. Thus, the depth of the second air collection space 30 increases with distance from the first collector panel 22.

Like the first collector panel 22, the second collector panel 28 includes second air inlet openings 32 that are distributed throughout the generally flat top portion 52, the sloping side walls 54 and the gutter walls 56 of the corrugations, as shown in FIG. 1B. The air inlet openings 32 provide openings for the second air collection space 30. In this case, however, the second air inlet openings 32 provide openings for air to travel from an intermediary flow chamber 36 and into the second air collection space 30. Clearly the intermediary air flow chamber 36 is located between the first air collection space 24 and the second air collection space 30 with respect to the flow of air, as will be discussed further below. In the present embodiment, the air inlet openings 32 are generally uniformly distributed over the second collector panel 28 and are formed by rotary punching slits in the second collector panel 28 such that the gaps at the end of the slits provide the air inlet openings 32.

The second collector panel 28 is also coated on the exterior side thereof with a solar radiation absorbing selective coating for absorbing solar radiation with low infra-red heat radiation emission at temperatures occurring at the collector panel on a sunny day.

A glazing, in the form of glazing panels 34, is located above and spaced from the second collector panel 28. The glazing panels 34 are fixed to the upper half of the perimeter metal frame 44 and to the longitudinal support bar 46 using a glazing frame 68 that is fixed to the surface of the upper half of the perimeter metal frame 44 and the longitudinal support bar 46. It is not necessary for the glazing panels 34 to be sealed in an air-tight manner to the perimeter metal frame 44 and to the longitudinal support bar 46. A tight fit is sufficient as small air gaps are permissible.

The space between the glazing panels 34 and the second collector panel 28 is the intermediary air flow chamber 36, referred to above. The intermediary air flow chamber 36 is in communication with the first air collection space 24 and with the second air collection space 30. Air flows into the intermediary air flow chamber 36 from the first air collection space 24 and air flows out of the intermediary air flow chamber 36 to the second air collection space 30. Clearly the longitudinal support bar 46 is sized, shaped and located to support ends of the first and second collector panels 22, 28 and to support the edge of the glazing frame 68 which holds the glazing panels 34, while allowing the passage of air from the first air collection space 24 into the intermediary air flow chamber 36. In the present embodiment, this air flow is provided by gaps in the track in the longitudinal support bar 46, through which the air flows.

An air duct 70 is in communication with the second air collection space 30, extending through the backing 50 and passing through the roof 100 of the building. The air duct 70 is connected to the second air collection space 30 by the outlet 38, for air to exit the second air collection space 30. As shown, the air outlet 38 is located in a position that is distal to the longitudinal support beam 46, where the distance between the second collector panel 28 and the backing 50 is greatest.

The air duct extends into the building to provide heated outside air to the interior of the building, through openings in the air duct 70.

A fan housing 72 is connected along the air duct 70 and includes the fan 40 for moving air from the second air collection space 30 into the interior of the building. Motorized dampers in the fan housing 72, are adjustable to allow air from the interior of the building to be mixed with heated air coming from the second air collection space 30. The fan 40 within the fan housing 72 is typically sized to meet ventilation requirements and to inhibit negative air pressure within the building. A positive air pressure can be achieved by introducing the heated outside air into the building through the air duct 70. Interior air leaves the building through openings and cracks. In the present embodiment, the fan 40 is a variable speed fan that is controlled by a controller dependent on the temperature of the incoming air. Thus, when the incoming air is below room temperature, the fan 40 runs at low speed. When the temperature of the incoming air is above room temperature, the fan speed increases to provide both ventilation air and space heating.

In use, the solar heating apparatus 20 is located on the exterior of the building, on the roof 100. Ambient air enters the first air collection space 24 through the air inlet openings 26 of the first collector panel 22, where the air is initially heated. Thus, the first collector panel 22 acts as an unglazed solar collector.

Next, air passes from the first air collection space 24 into the intermediary air flow chamber 36 and through air inlet openings 32 in the second collector panel 28, into the second air collection space 30. The air is further heated as it passes through the intermediary air flow chamber 36 and the second air collection space 30. Clearly, the second collector panel 28 acts as a glazed solar collector.

Finally, the air is withdrawn from the second air collection space 30 by the fan 40 and is expelled into the building through the duct 70, to provide heated ventilation air to the building.

Figures 4, 5:
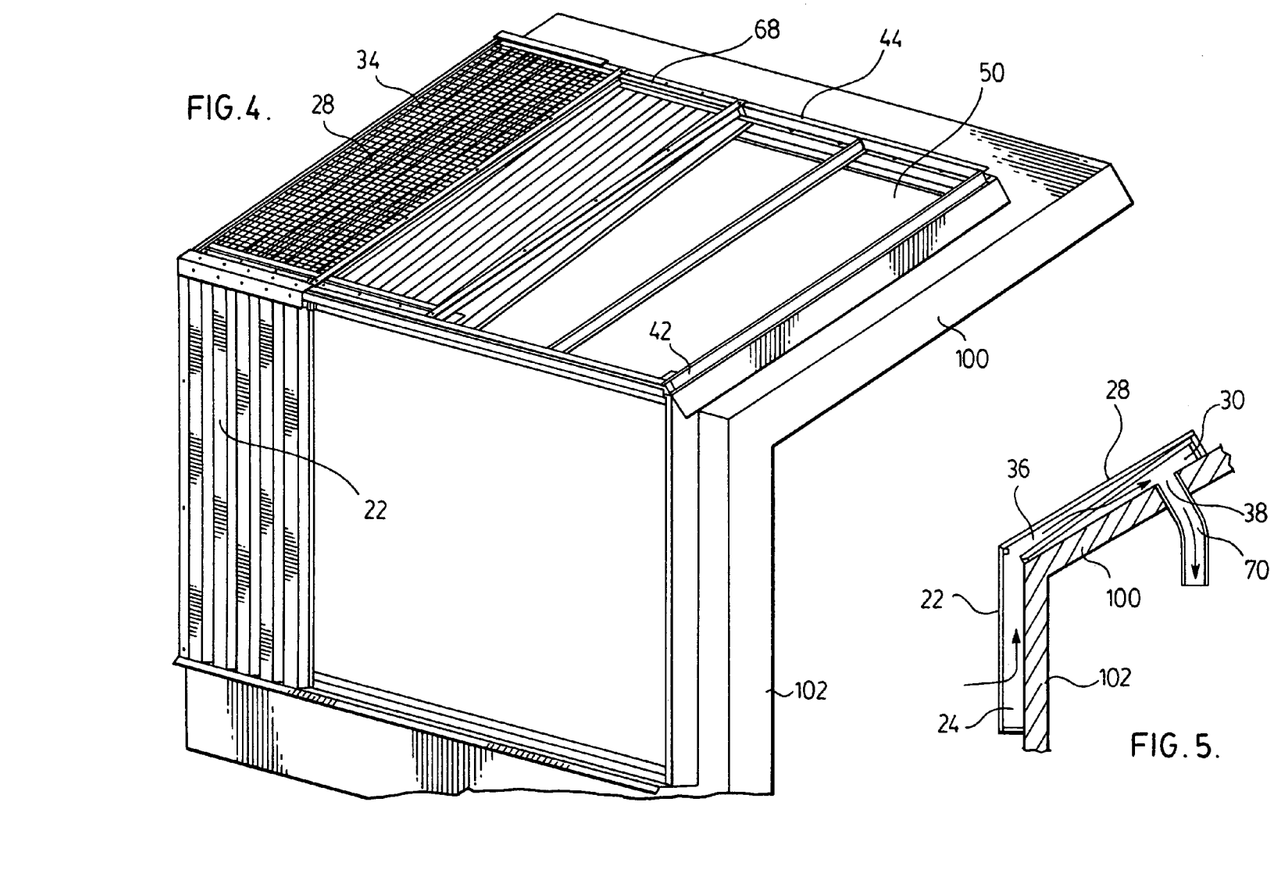
FIG. 4 is a perspective view of a solar heating apparatus according to another embodiment of the present invention, shown mounted to a wall and a roof, with portions of the apparatus missing for the purpose of illustration and description.
FIG. 5 is a sectional side view of the solar heating apparatus of FIG. 4, drawn to a smaller scale.

Reference is now made to FIGS. 4 and 5 to describe a solar heating apparatus 20 according to another embodiment of the present invention. Similar to the first described embodiment, the solar heating apparatus 20 of the present embodiment includes a first sunlight-absorbent collector panel 22 and a second sunlight-absorbent collector panel 28. Both the first and the second sunlight-absorbent collector panels 22, 28, are similar to the first and second sunlight-absorbent collector panels described above and therefore the first and second collector panels 22, 28 will not be further described herein. Also similar to the first described embodiment, glazing panels 34 are located above and spaced from the second collector panel 28. The glazing panels 34 are similar to the above-described glazing panels and are therefore not further described herein. Unlike the first-described embodiment, however, in the present embodiment, the first collector panel 22 is located on a wall 102 of the building. Rather than being located on the same wall, the second collector panel 28 is located on the roof 100 of the building. Thus, the metal framing structure 42 includes an elbow at a midpoint thereof, where the longitudinal support bar 46 is located, along the line of intersection of the wall 102 and the roof 100 of the building. The remainder of the solar heating apparatus 20, including the flow of air therethrough, is similar to the solar heating apparatus 20 as described above and therefore is not further described herein.

Figures 6, 7:
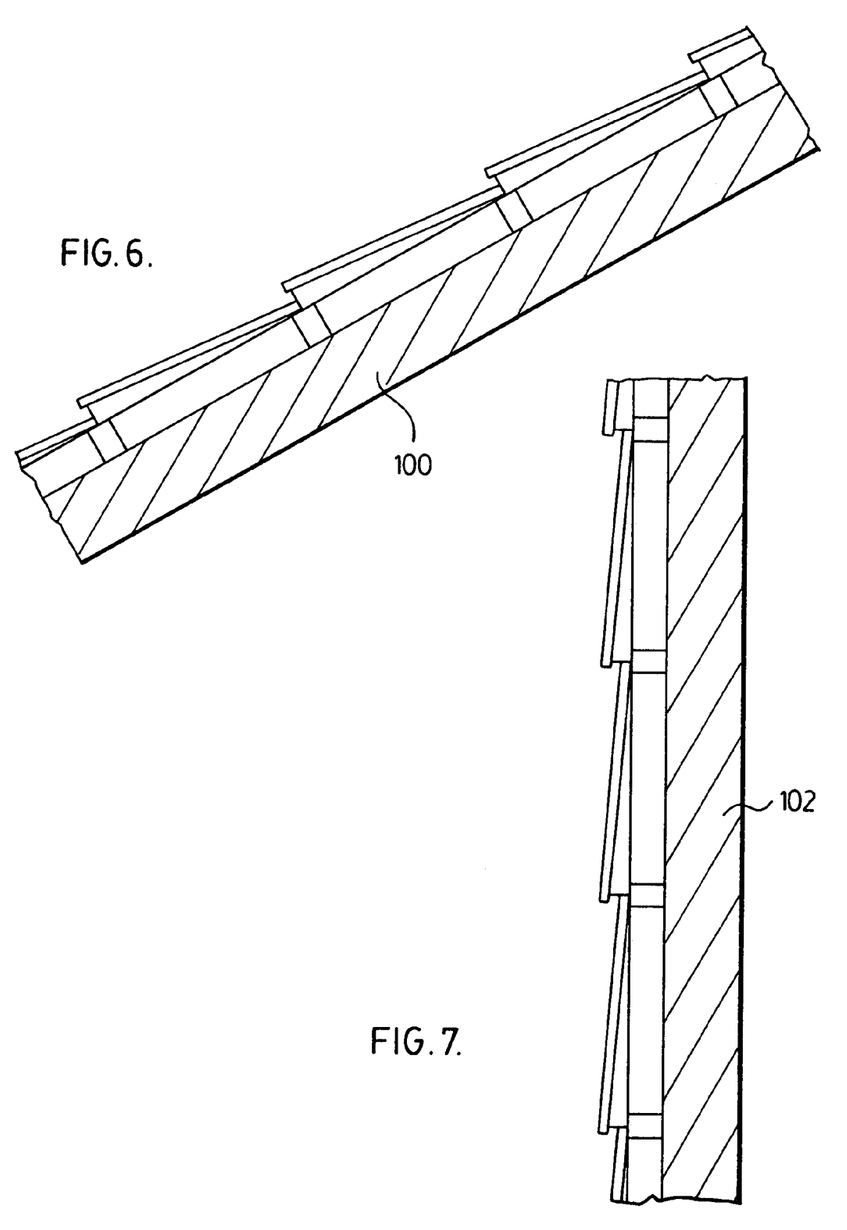
FIG. 6 is a side view of a solar heating apparatus according to another embodiment of the present invention, shown mounted to a roof.
FIG. 7 is a side view of a solar heating apparatus according to still another embodiment of the present invention, shown mounted to a wall.

Reference is now made to FIG. 6 to describe a solar heating apparatus 20 according to still another embodiment of the present invention. Rather than the first collector panel 22 being corrugated, the first collector panel 22 is made up of a number of small overlapping sub-panels, each sub-panel being angled with respect to the surface of the roof 100, as shown. Each sub-panel is closest to the roof 100 of the building at the upper-most portion of the sub-panel. Thus, the space between the sub-panel and the surface of the roof increases from the uppermost to the lowermost portion of each sub-panel. Rather than the air inlet openings 32 being located throughout the corrugated panel, the air inlet openings 32 are located at the lowermost ends of the sub-panels, where the spacing between the sub-panel and the surface of the roof 100 is the greatest. Although the first collector panel 22 is shown, it will be understood that the sub-panels as shown can also be used in a second collector panel 28 that includes a glazing 34 as described above.

Referring to FIG. 7, yet another embodiment of the present invention is shown. In this embodiment, the solar heating apparatus 20 is similar to the solar heating apparatus 20 shown in FIG. 6 and described above. In the present embodiment, however, the solar heating apparatus 20 is mounted to a wall 102 of a building rather than the roof 102.

The present invention has been described by way of examples. Modifications and variations to the above-described embodiments are possible. For example, while the first described embodiment refers to a uniform distribution of air inlet openings 26 in the first sunlight-absorbent collector panel, the density of air inlet opening in the first sunlight-absorbent collector panel can increase with distance from the second sunlight-absorbent collector panel. Similarly, the density of air openings 32 in the second sunlight-absorbent collector panel can increase with distance from the air outlet. Also, the size of the air inlet openings in the first sunlight-absorbent collector panel can increase with distance from the second sunlight-absorbent collector panel. Similarly, the size of the air inlet openings in the second sunlight-absorbent collector panel can increase with distance from the air outlet.

Other alternatives are also possible. For example, in the above-described embodiments, the tracks were formed in the longitudinal support bar 46. In an alternative embodiment, the tracks are fastened to the longitudinal support bar 46. In this case, a number of small track portions or clips are attached to the longitudinal support bar 46 and spaced apart to allow air flow in between. Similarly, tracks can be fastened to the perimeter metal frame 44, rather than being formed in the perimeter metal frame 44. Also, although the air inlet openings 26 and the air inlet openings 32 are described as being formed by rotary punching slits in the first and second collector panels 22, 28, respectively, in an alternative embodiment, the air inlet openings 26 and the air inlet openings 32 are provided by holes punched in the first and second collector panels 22, 28, respectively.

In yet another variation, both the first and second collector panels can be located on a wall of the building, rather than being located on a roof or on both a wall and a roof of the building. This provides collector panels with corrugations that run in substantially vertical planes, as best shown in FIG. 1.

Still other modifications and variations to the embodiments described herein may occur to those skilled in the art. All such modifications and variations are believed to be within the sphere and scope of the present invention.

What is claimed is:

1. An apparatus for pre-heating ventilation air for a building, comprising:
    a first sunlight-absorbent collector panel on said building, the panel being exposed to ambient air and defining a first air collection space between itself and said building, the first sunlight-absorbent collector panel having a plurality of air inlet openings to allow the ambient air to pass through the openings to the first air collection space;
    a second sunlight-absorbent collector panel on said building, adjacent said first sunlight-absorbent collector panel, the second sunlight-absorbent collector panel defining a second air collection space between itself and said building, the second sunlight-absorbent collector panel having a plurality of air inlet openings to allow air to pass through the openings to the second air collection space;
    a glazing covering said second sunlight-absorbent collector panel and defining an intermediary air flow chamber between itself and said second sunlight-absorbent collector panel, said intermediary air flow chamber being in communication with said first air collection space to receive air therefrom, said air inlet openings in said second sunlight-absorbent collector panel providing communication between said intermediary air flow chamber and said second air collection space;
    an air outlet from said second air collection space into said building for air flow therethrough;
    a fan in communication with said air outlet for moving air from said second air collection space into said building, through said air outlet.

2. The apparatus according to claim 1, wherein said first sunlight-absorbent collector panel is corrugated.

3. The apparatus according to claim 2, wherein said plurality of air inlet openings are comprised of at least one of slits and holes in the first sunlight-absorbent collector panel.

4. The apparatus according to claim 1, wherein said second sunlight-absorbent collector panel is corrugated.

5. The apparatus according to claim 4, wherein said plurality of air inlet openings are comprised of at least one of slits and holes in said second sunlight-absorbent collector panel.

6. The apparatus according to claim 1, wherein said first and second sunlight-absorbent collector panels are on a first surface of said building.

7. The apparatus according to claim 1, wherein said first sunlight-absorbent collector panel is on a first surface of said building and said second sunlight-absorbent collector panel is on a second surface of said building, adjacent said first surface.

8. The apparatus according to claim 1, wherein said air inlet openings in said first sunlight-absorbent collector panel are uniformly distributed on said panel.

9. The apparatus according to claim 1, wherein a density of said air inlet openings in said first sunlight-absorbent collector panel increases with distance from said second sunlight-absorbent collector panel.

10. The apparatus according to claim 1, wherein a size of said air inlet openings in said first sunlight-absorbent collector panel increases with distance from said second sunlight-absorbent collector panel.

11. The apparatus according to claim 1, wherein a density of said air inlet openings in said second sunlight-absorbent collector panel increases with distance from said air outlet.

12. The apparatus according to claim 1, wherein a size of said air inlet openings in said second sunlight-absorbent collector panel increases with distance from said air outlet.

13. The apparatus according to claim 1, wherein said first sunlight-absorbent collector panel includes a surface coating on an exterior side thereof, the surface coating permitting high absorption of solar radiation and low emission of far infra-red heat radiation.

14. The apparatus according to claim 1, wherein said second sunlight-absorbent collector panel includes a surface coating on an exterior side thereof, the surface coating permitting high absorption of solar radiation and low emission of far infra-red heat radiation.

15. The apparatus according to claim 1, wherein second sunlight-absorbent collector panel is located above said first sunlight-absorbent collector panel.

16. The apparatus according to claim 1, wherein said first sunlight-absorbent collector panel is located on a substantially vertical surface of said building.

17. The apparatus according to claim 16, wherein said second sunlight-absorbent collector panel is located on said substantially vertical surface of said building.

18. The apparatus according to claim 16, wherein said second sunlight-absorbent collector panel is located on a roof of said building.

19. The apparatus according to claim 16, wherein said first sunlight-absorbent collector panel is corrugated with corrugations running in substantially vertical planes.

20. The apparatus according to claim 1, wherein the first sunlight-absorbent collector panel is comprised of a plurality of substantially similar and overlapping sub-panels.

21. The apparatus according to claim 1, wherein the second sunlight-absorbent collector panel is comprised of a plurality of substantially similar and overlapping sub-panels.

22. A method of heating ventilation air for a building, comprising:
    providing a first sunlight-absorbent collector panel on said building, the panel being exposed to ambient air and defining a first air collection space between itself and said building, the first sunlight-absorbent collector panel having a plurality of air inlet openings to allow ambient air to pass through the openings to the first air collection space;
    providing a second sunlight-absorbent collector panel on said building, the second sunlight-absorbent collector panel defining a second air collection space between itself and said building, the second sunlight-absorbent collector panel having a plurality of air inlet openings to allow air to pass through the openings to the second air collection space;
    providing a glazing covering said second sunlight-absorbent collector panel and defining an intermediary air flow chamber between itself and said second sunlight-absorbent collector panel, said intermediary air flow chamber being in communication with said first air collection space to receive air therefrom, said air inlet openings in said second sunlight-absorbent collector panel providing communication between said intermediary air flow chamber and said second air collection space;

pre-heating outside air in the first air collection space, with solar heat from the first sunlight-absorbent collector panel and passing the pre-heated air into the intermediary flow chamber;

heating the pre-heated air in the second air collection space by passing the pre-heated air from the intermediary flow chamber into the second air collection space, to provide heated air;

withdrawing said heated air through an air outlet from said second air collection space and expelling said air into said building.

23. The method according to claim 22, wherein providing said first sunlight-absorbent collector panel on said building comprises providing the first sunlight-absorbent collector panel in which said sunlight-absorbent collector panel is corrugated.

24. The method according to claim 23, wherein providing said first sunlight-absorbent collector panel on said building comprises providing the first sunlight-absorbent collector panel in which said plurality of air inlet openings are comprised of at least one of slits and holes.

25. The method according to claim 22, wherein providing said second sunlight-absorbent collector panel on said building comprises providing the second sunlight-absorbent collector panel in which said sunlight-absorbent collector panel is corrugated.

26. The method according to claim 25, wherein providing said second sunlight-absorbent collector panel on said building comprises providing the second sunlight-absorbent collector panel in which said plurality of air inlet openings are comprised of at least one of slits and holes.

27. The method according to claim 22, wherein said first and second sunlight-absorbent collector panels are provided on a first surface of said building.

28. The method according to claim 22, wherein said first sunlight-absorbent collector panel is provided on a first surface of said building and said second sunlight-absorbent collector panel is provided on a second surface of said building, adjacent said first surface.

29. The method according to claim 22, wherein providing said first sunlight-absorbent collector panel on said building comprises providing the first sunlight-absorbent collector panel in which said air inlet openings are uniformly distributed on said panel.

30. The method according to claim 22, wherein pre-heating outside air comprises removing heat from substantially an entire surface of said first sunlight-absorbent collector panel.

31. The method according to claim 30, wherein providing said first sunlight-absorbent collector panel on said building comprises providing the first sunlight-absorbent collector panel in which a density of said air inlet openings increases with distance from said second sunlight-absorbent collector panel.

32. The method according to claim 30, wherein providing said first sunlight-absorbent collector panel on said building comprises providing the first sunlight-absorbent collector panel in which a size of said air inlet openings increases with distance from said second sunlight-absorbent collector panel.

33. The method according to claim 22, wherein heating the pre-heated air comprises removing heat from substantially an entire surface of said second sunlight-absorbent collector panel.

34. The method according to claim 33, wherein providing said second sunlight-absorbent collector panel on said building comprises providing the second sunlight-absorbent collector panel in which a density of said air inlet openings increases with distance from said air outlet.

35. The method according to claim 33, wherein providing said second sunlight-absorbent collector panel on said building comprises providing the second sunlight-absorbent collector panel in which a size of said air inlet openings increases with distance from said air outlet.

36. The method according to claim 22, wherein providing said first sunlight-absorbent collector panel on said building comprises providing a surface coating on an exterior side of said first sunlight-absorbent collector panel, the surface coating permitting high absorption of solar radiation and low emission of far infra-red heat radiation.

37. The method according to claim 22, wherein providing said second sunlight-absorbent collector panel on said building comprises providing a surface coating on an exterior side of said second sunlight-absorbent collector panel, the surface coating permitting high absorption of solar radiation and low emission of far infra-red heat radiation.

38. The method according to claim 22, wherein providing said second sunlight-absorbent collector panel comprises providing said second sunlight-absorbent collector panel above in a location above said first sunlight-absorbent collector panel.

39. The method according to claim 22, wherein providing said first sunlight-absorbent collector panel comprises providing a plurality of substantially similar sub-panels that comprise said first sunlight-absorbent collector panel.

40. The method according to claim 22, wherein providing said second sunlight-absorbent collector panel comprises providing a plurality of substantially similar sub-panels that comprise said second sunlight-absorbent collector panel.

41. An apparatus for use with a fan for supplying pre-heated ventilation air for a building, the apparatus comprising:

a first sunlight-absorbent collector panel on said building, the panel being exposed to ambient air and defining a first air collection space between itself and said building, the first sunlight-absorbent collector panel having a plurality of air inlet openings to allow the ambient air to pass through the openings to the first air collection space;

a second sunlight-absorbent collector panel on said building, adjacent said first sunlight-absorbent collector panel, the second sunlight-absorbent collector panel defining a second air collection space between itself and said building, the second sunlight-absorbent collector panel having a plurality of air inlet openings to allow air to pass through the openings to the second air collection space;

a glazing covering said second sunlight-absorbent collector panel and defining an intermediary air flow chamber between itself and said second sunlight-absorbent collector panel, said intermediary air flow chamber being in communication with said first air collection space to receive air therefrom, said air inlet openings in said second sunlight-absorbent collector panel providing communication between said intermediary air flow chamber and said second air collection space; and an air outlet from said second air collection space for air flow therethrough for supplying to said building after withdrawal of said pre-heated air by the fan.

42. The apparatus according to claim 1, wherein the fan is controlled at variable speeds depending on temperature of the air withdrawn from the air outlet.

* * * * *